(12) United States Patent
Shalaby

(10) Patent No.: US 6,861,503 B2
(45) Date of Patent: Mar. 1, 2005

(54) INTERLINKED SOLID POLYETHYLENE GLYCOLS AND COPOLYMERS THEREOF

(75) Inventor: Shalaby W. Shalaby, Anderson, SC (US)

(73) Assignee: Poly-Med, Inc., Anderson, SC (US)

(*) Notice: Subject to any disclaimer, the term of this patent is extended or adjusted under 35 U.S.C. 154(b) by 0 days.

(21) Appl. No.: 10/375,292

(22) Filed: Feb. 27, 2003

(65) Prior Publication Data

US 2003/0162940 A1 Aug. 28, 2003

Related U.S. Application Data

(60) Provisional application No. 60/359,974, filed on Feb. 27, 2002.

(51) Int. Cl.[7] .............................................. C08G 65/34
(52) U.S. Cl. ................. 528/425; 525/328.8; 525/328.9; 525/329.2; 525/419

(58) Field of Search ........................ 528/425; 525/328.8, 525/328.9, 329.2, 419

(56) References Cited

FOREIGN PATENT DOCUMENTS

EP      0952171     * 10/1999

* cited by examiner

*Primary Examiner*—Duc Truong
(74) *Attorney, Agent, or Firm*—Leigh Gregory

(57) ABSTRACT

The present invention is directed primarily to an interlinked crystalline solid polyethylene glycol composition (I-PEG) having a molecular weight of at least 20 kDa and a melting temperature of at least 40° C. and its use as an absorbable device having hydrolabile ester or carbonate interlinks that allow in vivo dissociation of the interlinked chain into excretable, low molecular weight PEG segments.

23 Claims, No Drawings

INTERLINKED SOLID POLYETHYLENE GLYCOLS AND COPOLYMERS THEREOF

The present application claims the benefit of prior provisional application No. 60/359,974, which was filed on Feb. 27, 2002.

BACKGROUND OF THE INVENTION

Solid polyethylene glycols (PEGs) are used in many pharmaceutical preparations as water soluble/absorbable excipients. However, because of their relatively lower molecular weight as compared to absorbable thermoplastic polyesters, commercially available PEGs, having a molecular weight of 10,000 or less are not suitable for use in preparing molded, or extruded, biomedical devices with high mechanical integrity, including high fracture resistance and flexural strength. Similarly, the commercially available PEGs cannot be used to form medical device coatings with sufficient flexibility and resistance to fracture to be clinically acceptable. On the other hand, exceptionally high molecular analogs of PEG, namely, polyethylene oxides having a molecular weight of 100,000 Da or more, can be used as tough coating, extrusion, or molding materials. Unfortunately, if such polyethylene oxides are used as soluble/absorbable implants, they are not fully excreted since their molecular weights exceed the cut-off molecular weight of 45,000 Da for passing through the kidneys. Other applications of polyethylene oxides having molecular weights exceeding 100,000 Da include their use (1) as highly water absorbent, swellable implants; and (2) in preparing highly viscous aqueous solutions at relatively low concentration. Once again, these applications cannot be associated with the use of these polymers as an absorbable/soluble implantable device, part of an absorbable implant, or a vehicle for a parenteral pharmaceutical formulation that are expected to absorb/biodegrade to extractable by-products. This situation evoked the need for a new approach to preparing derivatives of PEG, and allied polyalkylene glycols, that can be used effectively as coating or molded articles while allowing the release of molecular species having molecular weights that can be easily excreted through the kidneys. Accordingly, this invention deals with high to ultrahigh molecular weight derivatives of solid PEGs and allied polyalkylene glycols that can be readily absorbed and excreted.

SUMMARY OF THE INVENTION

The present invention is directed toward an interlinked crystalline solid polyethylene glycol (I-PEG) having a molecular weight ($M_w$) of at least 20 kDa and a melting temperature ($T_m$) of at least 40° C. made by interlinking a lower molecular weight solid PEG having at least a molecular weight of 1,000 Da. The covalent interlinking can be achieved by reacting the terminal hydroxyl groups of the lower molecular weight PEG with a reactive diester, such as diethyl oxalate, dimethyl succinate, or diethyl succinate in the presence of an organo-metallic catalyst, such as stannous octoate. Alternatively, an acrylic aliphatic carbonate, such as dibutyl or diphenyl carbonate, can be used instead of the diesters to yield carbonate interlinks between segments of the lower molecular weight PEG. N-Bis-pyrazoles of N-bis-imidazoles derivatives of dicarboxylic acid or carbonic acid can be used as substitutes for the dialkyl carbonate and acylic carbonate to create the ester and carbonate interlinks between the segments of the relatively low $M_w$ PEG, respectively.

This invention is also directed toward a covalently interlinked crystalline solid PEG wherein the interlinks are created in two steps. The first step entails end-grafting a lactone or cyclic alkylene carbonate onto the two terminal hydroxyl groups of the relatively low $M_w$ PEG. The two terminal hydroxyl groups of the resulting end-grafted PEG are then reacted with a diisocyanate, such as 1,6-hexamethylene diisocyanate, to yield a higher molecular weight PEG comprising urethane interlinks that covalently join the PEG segment indirectly through polylactone or polyalkylene carbonate segments.

The interlinked PEG subject of this invention is intended for many applications that require having transient, soluble/absorbable polymeric materials for use as implantable devices or part of implanted devices which can function as intravascular stents or similar devices in the urinogenital system. Materials subject of this invention are also intended for use as hemostatic devices or part of hemostatic devices, such as those used in sealing punctured blood vessels as in the case of the femoral artery following angioplasty.

Specifically, the present invention is directed to a covalently interlinked crystalline solid polyethylene glycol composition, which is formed of solid polyethylene glycol (PEG) segments having terminal hydroxyl groups and interlinks covalently connecting the solid polyethylene glycol segments. The interlinked polyethylene glycol composition has a melting temperature of at least 40° C. and molecular weight of at least 20 kDa. Preferably, the solid PEG segments have a molecular weight of at least 1 kDa.

In one embodiment the interlinks are dicarboxylate moieties, which are the reaction product of the terminal hydroxyl groups of the polyethylene glycol segments and at least one diester of a dicarboxylic acid, selected from diethyl oxalate, diethyl succinate, dimethyl succinate, dimethyl glutarate, diethyl glutarate, dimethyl adipate, and diethyl adipate.

In another embodiment the interlinks are carbonate moieties, which are the reaction product of the terminal hydroxyl groups of the polyethylene glycol segments and at least one dialkyl carbonate, preferably dibutyl carbonate.

The present invention is also directed to a covalently interlinked crystalline polyethylene glycol composition which is formed of solid polyethylene glycol segments having moieties derived from a cyclic monomer end-grafted onto both ends of each polyethylene glycol segment, the end-grafted polyethylene glycol segments having terminal hydroxyl groups, and interlinks covalently connecting the end-grafted polyethylene glycol segments. Preferably, the interlinks are urethane moieties, which are the reaction product of the terminal hydroxyl groups of the end-grafted polyethylene glycol segments and an aliphatic diisocyanate selected from lysine diisocyanate, 1,6-hexamethylene diisocyanate, and 1,4-tetramethylene diisocyanate. In one embodiment the cyclic monomer is a lactone selected from caprolactone, lactide, p-dioxanone, and glycolide. In an alternative embodiment the cyclic monomer is a carbonate such as trimethylene carbonate.

In another embodiment the covalently interlinked crystalline polyethylene glycol composition itself is end-grafted. As such the PEG composition includes moieties derived from at least one cyclic monomer end-grafted onto both ends of the interlinked polyethylene glycol composition, the at least one cyclic monomer selected from caprolactone, p-dioxanone, lactide, glycolide, and trimethylene carbonate.

A preferred application of the present covalently interlinked crystalline polyethylene glycol composition is as a coating on an implantable stent in a body lumen. Preferably, the implantable stent is placed in a blood vessel.

Another preferred application of the present covalently interlinked crystalline polyethylene glycol composition is as an implantable stent for use in the urinogenital tract.

Yet another preferred application of the present covalently interlinked crystalline polyethylene glycol composition is in the form of an implantable hemodialysis device comprising a subcutaneous catheter protrusion cover.

A still further preferred application of the present covalently interlinked crystalline polyethylene glycol composition is as hemostatic electrospun device for sealing a femoral artery hole following angioplasty. Preferably, the hemostatic device comprises chitosan.

DETAILED DESCRIPTION OF THE PREFERRED EMBODIMENTS

This invention deals with interlinked PEG having an overall molecular weight of more than 20,000 Da, which also absorbs in the biologic environment through hydrolysis of hydrolabile ester or carbonate interlinks therein, and readily generates PEG by-products having an average molecular weight of 10,000 Da or less. In general, the present invention is directed to polyalkylene glycol molecules, preferably polyethylene glycol (PEG) molecules, which are linked together directly or indirectly by ester or carbonate groups. Preferably, the directly interlinked PEG of the present invention, is a solid crystalline PEG having a molecular weight of at least 1,000 Da that is adjoined or interlinked with oxalate or carbonate groups although other esters, such as succinates, glutarates, adipates, sebacates, or terephthalates, may be employed. In one preferred embodiment bis-pyrazole, bis-dimethyl-pyrazole, or bis-imidazole derivatives of a carboxylic acid such as adipic and sebacic acids are employed as the interlinking agent for the PEG.

In accordance with the present invention, polyalkylene glycols and specifically polyethylene glycols are interlinked by reaction with, for example, a dialkyl oxalate, a dialkyl carbonate, diphenyl carbonate or a mixture thereof, in the presence of an organometallic transesterification catalyst at a suitable temperature to produce interlinked polyalkylene glycols and specifically polyethylene glycols having different and higher overall molecular weights than the parent polyalkylene glycol.

More preferably, the interlinked PEG (I-PEG) or polyalkylene glycol (I-PAG) of the present invention comprise hydroxyl end-groups. This is achieved by employing a limited stoichiometric excess of PEG or PAG during the reaction with an ester, such that the quantity of the excess PEG or PAG is precalculated to insure the production of the I-PEG or I-PAG at the desired molecular weight. Ester end-groups are achieved by employing a stoichiometric excess of the ester, although such ester end-groups are less preferred. One hydroxyl and one ester end-group result from an exact stoichiometric ratio of the reactants. Most preferably, the I-PEG or I-PAG is made with exact stoichiometry of the PEG or PAG and the diester or acyclic alkylene carbonate to support the formation of said I-PEG or I-PAG with an infinite molecular weight. Meanwhile, hydroxyl end-groups are preferred because they may be employed as reactive sites for grafting cyclic monomers onto the interlinked PEG.

And a specific preferred aspect of this invention deals with an I-PEG or I-PAG having a chain made with one or two reactive hydroxyl end-groups. Such hydroxy-terminated chains may then be end-grafted with one or more of the following cyclic monomers to produce segmented/block copolymers with a range of absorption profiles: trimethylene carbonate, ε-caprolactone, glycolide, lactide, 1,5-dioxapan-2-one, and p-dioxanone.

Another aspect of this invention deals with reactive melt blending and trans-esterification of oxalate-terminated interlinked PEG (or a block copolymer with polypropylene glycol, as discussed in greater detail below) with a hydroxy-terminated absorbable amorphous or low melting copolyester, such as 50/50 dl-lactide/glycolide copolymer or 90/10 ε-caprolactone/glycolide copolymer, respectively.

Alternatively, in accordance with the present invention PEG may be block copolymerized with polypropylene glycol (PPG) to prepare the respective interlinked copolymer, I-PEG-PPG-PEG (e.g., interlinked poloxamer) to modulate the water solubility of the latter and hence, the absorption/dissolution profile before and after end-grafting with cyclic monomers.

Another aspect of this invention deals with hydrolabile ester or carbonate, covalently interlinked polyalkylene glycol, such as PEG or a block copolymer of PEG and propylene glycol (PPG), wherein the hydrolabile ester or carbonate groups are used as components of polymeric interlinks comprising an indirect urethane interlinking group to achieve such indirect interlinking. Accordingly, the two hydroxyl terminal groups of a polyalkylene glycol, or a block copolymer of polyethylene glycol are end-grafted with one or more cyclic monomer from the group entailing ε-caprolactone, p-dioxanone, lactide, and glycolide to produce primarily a block copolymer comprising (1) a polyalkylene glycol or copolyalkylene glycol block; (2) one or more polyester or carbonate segments/blocks; and (3) two terminal hydroxyl groups. The resultant hydroxy-terminated copolymer is then reacted with predetermined quantities of a diisocyanate to produce a predetermined number of interlinks needed to achieve the desired overall molecular weight of the indirectly interlinked polyalkylene glycol. In a specific aspect of this invention, the diisocyanate is an aliphatic molecule, such as 1,6-hexamethylene diisocyanate, 1,4-tetramethylene diisocyanate, or lysine diisocyanate. In a more specific aspect of this invention the interlinking reaction using the diisocyanate is carried out in a solution of the hydroxyl-terminated, lactone- or carbonate- end-grafted polyalkylene glycol in a non-reactive organic solvent, such as dry acetone, dioxane, methylene chloride, toluene, or chloroform in the presence of an organometallic catalyst or other suitable catalyst. The resultant product is precipitated in n-hexane. The dried precipitate can be further purified using a second cycle of dissolution precipitation. In another aspect of this invention, a carbodiimide is used as an alternative to the diisocyanate to produce urea functionalities as the indirect interlinking component for the polyalkylene glycol.

Another aspect of this invention deals with the melt-processing of I-PEGs or their analogs and their copolyesters into molded devices for use as (1) a stent for preventing restenosis of a body lumen; and (2) a connecting sleeve in a hemodialysis system. One more specific aspect of this invention deals with electrospinning of a solution of the interlinked polymers subject of the invention to form nonwoven fabric, microporous foam, or solid-walled, thin tubes. Another aspect of this invention deals with the use of the electrospinning process to produce composite constructs comprising the interlinked polymers subject of the invention and one or more absorbable/biodegradable copolymer through two more steps of electrospinning. In a preferred aspect of this invention the absorbable/biodegradable components of the said composite constructs can be selected from the group of polymers, including chitosan, polyvinyl alcohol, polylactide, copolylactide, polycaprolactone, copolycarprolactone, and copolycarbonate. The selection of the constituent monomers of such copolymers will be based on new attributes desired to impart to the composite construct. Likewise, the weight fraction of the polymers subject of this invention in the composite construct will be dependent on the intended application. Another aspect of this invention deals with the use of the interlinked polymer subject of the invention as a hemostatic sealant for punctured blood vessels as usually encountered in the femoral artery following angioplasty. In a more specific aspect of this invention, the hemostatic sealant device is made of electrospun, interlinked polymers subject of this invention. Another aspect of this invention deals with a sealant device comprising polymers subject of the invention as part of a composite construct with chitosan prepared by electrospinning. A more specific aspect of this invention deals with a hemostatic sealant, electrospun, composite construct comprising one or more of the polymers subject of this invention as well as chitosan, and an additional hemostatic agent, which aids hemostasis directly or indirectly, e.g., an iron compound that aids blood coagulation or a vasoconstrictor that reduces blood flow, respectively.

Another aspect of this invention deals with use of interlinked PEGs (I-PEGs) and their copolymers as described herein as an adherent coating on endovascular metallic or polymeric stents for the controlled release of antiproliferative, bioactive agents. Such coating may include at least 1% of a bioactive compound. In one specific embodiment the polymer described in this invention may be employed as a primary coating for a metallic stent, including at least about 1% of bioactive agent with a second coating which is free of any bioactive compound. Such second coating may comprise the polymer or copolymer of the present invention or a different absorbable or non-absorbable polymer.

Another aspect of this invention deals with use of I-PEGs (or I-PAGs) or their copolymers as water-soluble excipients in an absorbable drug-bearing polyester coating to control the drug release profile through gradual generation of porosity and, hence, increase in surface area. Another aspect of this invention deals with the use of I-PEGs (or I-PAGs) or their copolymers as an absorbable, high lubricity surface coating for medical devices. Another aspect of this invention addresses the use of I-PEGs (or I-PAGs) or their copolymers to produce molded, absorbable implants, or components thereof, with less than one-month residence time in the biological environment. Another aspect of this invention deals with converting I-PEG (or I-PAG) to a molded transient sleeve for use in conjunction with guided placement of dialysis catheter and connector into patients with impaired kidney function and aiding the positional stability of catheter/connector following I-PEG (or I-PAG) absorption/dissolution at the implantation site. Specifically, while the present interlinked PEG (or PAG) polymer or copolymer may be advantageously employed in a variety of medical devices, a device which particularly benefits from the properties of the present polymer or copolymer is the catheter cover disclosed in a co-pending provisional U.S. patent application filed by J. Daniel Raulerson entitled *Subcutaneous Catheter Protrusion Cover*, filed on Feb. 27, 2002, and which is incorporated herein by reference. That device is a cover for a protrusion on a catheter which is located subcutaneously in the body of a user and which is dissolvable or absorbable in the body of the user.

Another aspect of this invention deals with the use of I-PEGs (or I-PAGs) or their copolymers as surface lubricants for surgical staples and sutures. Another aspect of this invention deals with the use of I-PEG (or I-PAG) as extruded, absorbable implants or components thereof. Another aspect of this invention deals with the use of I-PEG as a component of a biocomponent filament. Another aspect of this invention deals with the use of I-PEG copolymers to produce monofilament and multifilament yarns for the subsequent production of absorbable biomedical textile constructs.

Given below are illustrative examples of the polymeric compositions subject of this invention and their conversion to useful articles.

EXAMPLE 1

Oxalate-Interlinked PEG-8000 (O-I-PEG-8K)

Predried PEG 8000 (90 g, 0.01125 mole) and distilled diethyl oxalate (9.86 g, 0.0675 mole) were charged under dry nitrogen into a pre-dried, single-neck glass reactor equipped with an attachment for mechanical stirring and distillation of volatile reaction by-products. The reactor was purged with nitrogen and stannous octoate was added (0.015 ml of a 0.2 M toluene solution, $3 \times 10^{-6}$ mole). The reactants were heated under nitrogen to 120° C. and maintained at that temperature while stirring for 15 minutes. The reaction temperature was increased to 150° C. while mixing and maintained at that temperature for one hour. At the conclusion of this period, was cooled below 100° C. and the stirrer was disengaged and removed from the molten reaction mixture product. After cooling the reactor to allow the product to solidify, the single-neck reactor was attached to a rotating vacuum evaporator for pursuing thin-film polycondensation/interlinking. The system was then purged with dry nitrogen and gradually heated under reduced pressure (~0.1 mm Hr.) to 150° C. while maintaining a slow and then moderate circular rotation of the reactor. The interlinking was allowed to continue for at least 10 hours at 150° C. or until the desired molecular weight is achieved. The system was then cooled to room temperature and the product was dissolved in toluene for purification. The polymer was then precipitated from the toluene solution in a stirred, cold hexane (as a non-solvent). The precipitated polymer was then dried under reduced pressure at 25° C. and then 40° C. until a constant weight was attained.

The polymer was characterized for (1) identity by IR and NMR; (2) thermal properties by DSC; and (3) molecular dimension by GPC and inherent viscosity. Analytical data of a typical polymer are listed below:

| | | |
|---|---|---|
| GPC (in $CH_2Cl_2$): | $M_n$ = 61.2 kDa | $M_w$ = 117.9 kDa |
| I.V. ($CHCl_3$) = 0.94 dL/g | DSC: $T_m$ = 61° C. | $\Delta H_f$ = 139 J/g |

EXAMPLE 2

Oxalate-Interlinked PEG-10,000 (O-I-PEG-10K)

The interlinked polymer was prepared using conditions that were identical to those used in Example 1 with the exception of using 112.5 g (0.01125 mole) of PEG-10,000. Analytical data of the interlinked polymer are listed below:

| | | |
|---|---|---|
| GPC (in CH$_2$Cl$_2$): | M$_n$ = 48.2 kDa | M$_w$ = 91.6 kDa |
| I.V. (CHCl$_3$) = 1.59 dL/g | DSC: T$_m$ = 63° C. | ΔH$_f$ = 172 J/g |

EXAMPLE 3

Succinate-Interlinked PEG-8000(S-I-PEG-8K)

The S-I-PEG-8K was prepared as described using a similar scheme to that used in the preparation of O-I-PEG-8K of Example 1 with the exception of (1) substituting diethyl oxalate with a molar equivalent of dimethyl succinate; (2) prolonging the reaction temperature at 150° C. under nitrogen for 3 hours; and (3) prolonging the reaction time at 150° C. under reduced pressure to 15 hours or more until the desired molecular weight is achieved. The product was isolated, purified, and characterized as described for O-I-PEG-8K of Example 1

EXAMPLE 4

Indirectly Interlinked PEG-8000 (I-I-PEG-8K)

The preparation of I-I-PEG-8K is achieved in two steps. The first step entails the end-grafting of predried PEG-8000 (90 g, 0.01125 mole) with trimethylene carbonate (TMC) (10.2 g, 0.1 mole) under dry nitrogen atmosphere in the presence of a catalytic amount of stannous octoate (0.30 ml of a 0.2 M toluene solution, 6×10$^{-5}$ mole). The end-grafting is carried out as follows: (1) the PEG, TMC, and stannous octoate are charged to a predried glass reactor equipped for mechanical stirring and a torque meter (to monitor viscosity) under dry nitrogen; (2) the temperature of the reactant is raised to 150° C. during 30 minutes while stirring; and (3) the polymerization is continued at 150° C. for 3 hours or until all the TMC is reacted. Samples of the resulting end-grafted PEG are analyzed for molecular weight by GPC, identity by IR and NMR. In the second step, the end-grafting polymer from the first step is reacted with a stoichiometric amount of 1,6-hexane diisocyanate, according to the following scheme. Thus, the end-grafted product is diluted with dry toluene (100 ml) and heated to 80° C. To this is added the stoichiometric amount of 1,6-hexamethylene diisocyanate (1.892 g, 0.01125 mole) in dry toluene (20 ml) over a period of 30 minutes. The reaction is continued for 3 hours or until a constant viscosity of reactants is achieved. The resultant viscous solution is cooled to 25° C. and methanol (0.5 ml) is added to react with available isocyanate end-groups. The resulting polymer is purified by precipitation in hexane, dried, and characterized as described for O-I-PEG-80 of Example 1.

EXAMPLE 5

Compression Molding of O-I-PEG-8K (from Example 1)

A four-piece mold (three-piece female part and 1 male part) was used for compression molding a device as discussed above. The process entailed (1) heating a laboratory Carver press at 70° C.; (2) placing the mold for 8 to 10 minutes in the press at 70° C.; (3) removing the hot mold and coating it lightly with a vegetable oil as a mold release; (4) filling the female part of the mold with a sufficient amount of dry polymer and placing it into the press for 8–10 minutes to melt the polymer; (5) removing the mold with the molten polymer and placing it in a vacuum chamber to remove air bubbles from the melt; (6) inserting the center plunger (male part) into the mold and placing the assembled mold in the press and completing the compression molding for 2 minutes at 70° C. under pressure of 2000 psi; (7) quenching the mold to 35° C., releasing the pressure, and removing the mold; and (8) disassembling the mold to remove the sleeve. The sleeve was then scoured with isopropyl alcohol in a laminar flow hood and air dried for 10 minutes. The sleeve was then placed in a sterile container and dried under reduced pressure at room temperature.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims. Moreover, Applicants hereby disclose all sub-ranges of all ranges disclosed herein. These sub-ranges are also useful in carrying out the present invention.

That which is claimed is:

1. A covalently interlinked crystalline solid polyethylene glycol composition comprising solid polyethylene glycol segments having terminal hydroxy groups and interlinks covalently connecting the solid polyethylene glycol segments, the interlinked polyethylene glycol having a melting temperature of at least 40° C. and molecular weight of at least 20 kDa.

2. A covalently interlinked crystalline polyethylene glycol composition as set forth in claim 1 wherein the solid polyethylene glycol segments have a molecular weight of at least 1 kDa.

3. A covalently interlinked crystalline polyethylene glycol composition as set forth in claim 2 wherein the interlinks comprise dicarboxylate moieties.

4. A covalently interlinked crystalline polyethylene glycol composition as set forth in claim 3 wherein the dicarboxylate moieties comprise the reaction product of the terminal hydroxyl groups of the polyethylene glycol segments and at least one diester of a dicarboxylic acid.

5. A covalently interlinked crystalline polyethylene glycol composition as set forth in claim 4 wherein the at least one diester is selected from the group consisting essentially of diethyl oxalate, diethyl succinate, dimethyl succinate, dimethyl glutarate, diethyl glutarate, dimethyl adipate, and diethyl adipate.

6. A covalently interlinked crystalline polyethylene glycol composition as set forth in claim 2 wherein the interlinks comprise carbonate moieties.

7. A covalently interlinked crystalline polyethylene glycol composition as set forth in claim 6 wherein the carbonate moieties comprise the reaction product of the terminal hydroxyl groups of the polyethylene glycol segments and at least one dialkyl carbonate.

8. A covalently interlinked crystalline polyethylene glycol composition as set forth in claim 7 wherein the dialkyl carbonate comprises dibutyl carbonate.

9. A covalently interlinked crystalline polyethylene glycol composition comprising:
   solid polyethylene glycol segments having moieties derived from a cyclic monomer end-grafted onto both ends of each polyethylene glycol segment, the end-grafted polyethylene glycol segments having terminal hydroxyl groups; and
   interlinks covalently connecting the end-grafted polyethylene glycol segments.

10. A covalently interlinked crystalline polyethylene glycol composition as set forth in claim 9 wherein the interlinks comprise urethane moieties.

11. A covalently interlinked crystalline polyethylene glycol composition as set forth in claim 10 wherein the urethane moieties comprise the reaction product of the terminal hydroxyl groups of the end-grafted polyethylene glycol segments and an aliphatic diisocyanate.

12. A covalently interlinked crystalline polyethylene glycol composition as set forth in claim 11 wherein the aliphatic diisocyanate is selected from the group consisting essentially of lysine diisocyanate, 1,6-hexamethylene diisocyanate, and 1,4-tetramethylene diisocyanate.

13. A covalently interlinked crystalline polyethylene glycol composition as set forth in claim 9 wherein the cyclic monomer comprises a lactone.

14. A covalently interlinked crystalline polyethylene glycol composition as set forth in claim 13 wherein the lactone is selected from the group consisting essentially of caprolactone, lactide, p-dioxanone, and glycolide.

15. A covalently interlinked crystalline polyethylene glycol composition as set forth in claim 9 wherein the cyclic monomer comprises a carbonate.

16. A covalently interlinked crystalline polyethylene glycol composition as set forth in claim 15 wherein the carbonate comprises trimethylene carbonate.

17. A covalently interlinked crystalline polyethylene glycol composition as set forth in claim 1 further comprising moieties derived from at least one cyclic monomer end-grafted onto both ends of the interlinked polyethylene glycol composition, the at least one cyclic monomer selected from the group consisting essentially of caprolactone, p-dioxanone, lactide, glycolide, and trimethylene carbonate.

18. A covalently interlinked crystalline polyethylene glycol composition as set forth in claim 1 in the form of a coating on an implantable stent in a body lumen.

19. A covalently interlinked crystalline polyethylene glycol composition as set forth in claim 18 wherein the implantable stent is placed in a blood vessel.

20. A covalently interlinked crystalline polyethylene glycol composition as set forth in claim 1 in the form of an implantable stent for use in the urinogenital tract.

21. A covalently interlinked crystalline polyethylene glycol composition as set forth in claim 1 in the form of an implantable hemodialysis device comprising a subcutaneous catheter protrusion cover.

22. A covalently interlinked crystalline polyethylene glycol composition as set forth in claim 1 in the form of a hemostatic electrospun device for sealing a femoral artery hole following angioplasty.

23. A covalently interlinked crystalline polyethylene glycol composition as set forth in claim 22 wherein the hemostatic device comprises chitosan.

* * * * *